United States Patent
Fox

(10) Patent No.: US 11,078,928 B2
(45) Date of Patent: Aug. 3, 2021

(54) HYDRAULIC CONTROL UNIT HAVING FILL PORT

(71) Applicant: Eaton Corporation, Cleveland, OH (US)

(72) Inventor: Matthew Fox, Ceresco, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 16/110,357

(22) Filed: Aug. 23, 2018

(65) Prior Publication Data

US 2018/0363681 A1    Dec. 20, 2018

Related U.S. Application Data

(63) Continuation of application No. PCT/US2017/019016, filed on Feb. 23, 2017.
(Continued)

(51) Int. Cl.
*F15B 1/22*    (2006.01)
*B60K 17/16*    (2006.01)
(Continued)

(52) U.S. Cl.
CPC .............. *F15B 1/22* (2013.01); *B60K 17/16* (2013.01); *B60K 17/20* (2013.01); *F15B 1/24* (2013.01);
(Continued)

(58) Field of Classification Search
CPC .......... F15B 1/22; F15B 1/24; F15B 2201/41; B60K 17/16; B60K 17/20; F16H 48/32; F16H 48/22
(Continued)

(56) References Cited

U.S. PATENT DOCUMENTS

| 2,239,866 A | 4/1941 | Vickers |
| 2,853,091 A | 9/1958 | Joseph |

(Continued)

FOREIGN PATENT DOCUMENTS

| CN | 104006139 A | 8/2014 |
| DE | 3524615 A1 | 1/1987 |

(Continued)

OTHER PUBLICATIONS

International Search Report and Written Opinion for International Application No. PCT/US2017/019016 dated Jun. 7, 2017, 9 pages.
(Continued)

*Primary Examiner* — Craig M Schneider
*Assistant Examiner* — David R Deal
(74) *Attorney, Agent, or Firm* — RMCK Law Group PLC

(57) ABSTRACT

A hydraulic control unit that delivers hydraulic fluid to a limited slip differential includes a hydraulic control unit housing, a vent hole and first and second passageways. The hydraulic control unit housing has an accumulator housing portion that houses a biasing assembly and a piston. The accumulator housing portion forms an accumulator chamber with the piston. The vent hole is defined in the hydraulic control unit housing. The first passageway is defined in the hydraulic control unit housing. The second passageway is defined in the hydraulic control unit housing that intersects the vent hole and is oriented at a different angle than the first passageway. The vent hole is dual purpose permitting hydraulic fluid entry into the accumulator chamber through the second passageway while air is permitted to escape the hydraulic control unit housing through the vent hole.

20 Claims, 6 Drawing Sheets

Related U.S. Application Data

(60) Provisional application No. 62/298,746, filed on Feb. 23, 2016.

(51) Int. Cl.
  *F15B 1/24* (2006.01)
  *F16H 48/32* (2012.01)
  *F16H 48/22* (2006.01)

(52) U.S. Cl.
  CPC .......... *F16H 48/32* (2013.01); *F15B 2201/41* (2013.01); *F16H 48/22* (2013.01)

(58) Field of Classification Search
  USPC .......................................................... 138/31
  See application file for complete search history.

(56) References Cited

U.S. PATENT DOCUMENTS

| | | | |
|---|---|---|---|
| 2,917,898 A | 12/1959 | Frank | |
| 3,726,063 A | 4/1973 | Magorien et al. | |
| 4,479,395 A | 10/1984 | Riley | |
| 4,667,473 A | 5/1987 | Robinson | |
| 4,738,595 A * | 4/1988 | Gaiser | B60T 8/4031 417/307 |
| 4,769,990 A * | 9/1988 | Bach | B60T 8/4031 138/31 |
| 4,787,471 A | 11/1988 | Kobayashi | |
| 4,867,010 A | 9/1989 | Stettler | |
| D308,209 S | 5/1990 | Laqua et al. | |
| 5,827,145 A | 10/1998 | Okcuoglu | |
| 5,975,653 A * | 11/1999 | Zaviska | B60T 8/34 303/116.4 |
| 6,390,133 B1 * | 5/2002 | Patterson | B60T 8/3615 138/30 |
| 7,418,887 B2 | 9/2008 | Garlick | |
| 7,472,547 B2 | 1/2009 | Grosskopf et al. | |
| 7,762,177 B2 | 7/2010 | Fischer | |
| 7,806,142 B2 | 10/2010 | Baros et al. | |
| 7,857,723 B2 | 12/2010 | Krisher | |
| 7,891,730 B2 | 2/2011 | Rikkert | |
| 7,985,162 B2 | 7/2011 | Buchele et al. | |
| 9,080,710 B2 * | 7/2015 | Norem | F16L 55/053 |
| D741,916 S | 10/2015 | Fox | |
| D744,542 S | 12/2015 | Edler et al. | |
| D749,642 S | 2/2016 | Fisher et al. | |
| 10,330,187 B2 | 6/2019 | Fisher et al. | |
| 2002/0103053 A1 | 8/2002 | Thompson | |
| 2003/0059310 A1 | 3/2003 | Koenig et al. | |
| 2005/0167228 A1 | 8/2005 | Baxter | |
| 2006/0283319 A1 * | 12/2006 | Garlick | F16H 48/08 91/499 |
| 2008/0042488 A1 | 2/2008 | Anderson | |
| 2008/0060867 A1 | 3/2008 | Oda et al. | |
| 2009/0138166 A1 | 5/2009 | Bruder | |
| 2010/0218746 A1 | 9/2010 | Rabhi | |
| 2011/0147111 A1 | 6/2011 | Sun et al. | |
| 2012/0085451 A1 | 4/2012 | Poskie et al. | |
| 2012/0329592 A1 | 12/2012 | Sun et al. | |
| 2014/0130924 A1 * | 5/2014 | Basin | B60T 8/00 138/31 |
| 2014/0179484 A1 | 6/2014 | Fox et al. | |
| 2014/0274529 A1 | 9/2014 | Edler et al. | |
| 2014/0305116 A1 | 10/2014 | Hiyoshi | |
| 2015/0057125 A1 * | 2/2015 | Pump | F16H 57/0409 475/160 |
| 2015/0105210 A1 | 4/2015 | Wadhva et al. | |
| 2015/0292611 A1 * | 10/2015 | Miyamoto | F16H 48/24 475/84 |
| 2016/0076634 A1 | 3/2016 | Mitsubori et al. | |
| 2016/0091077 A1 | 3/2016 | Sotani et al. | |
| 2018/0156345 A1 * | 6/2018 | Kanda | F15B 13/0431 |

FOREIGN PATENT DOCUMENTS

| | | |
|---|---|---|
| EP | 0481022 B1 | 11/1995 |
| WO | 2015157511 A1 | 10/2015 |

OTHER PUBLICATIONS

European Search Report for Application No. EP15776679 dated Nov. 20, 2017, 6 pages.

International Search Report and Written Opinion for International Application No. PCT/US2015/025096 dated Jul. 21, 2015, 9 pages.

* cited by examiner

US 11,078,928 B2

HYDRAULIC CONTROL UNIT HAVING FILL PORT

CROSS-REFERENCE TO RELATED APPLICATIONS

This application is a continuation of International Application No. PCT/US2017/019016 filed Feb. 23, 2017, which claims the benefit of U.S. Provisional Patent Application No. 62/298,746 filed on Feb. 23, 2016, the contents of which is incorporated herein by reference.

FIELD

The present disclosure relates generally to limited slip differentials and more particularly to a hydraulic control unit that delivers hydraulic fluid to a limited slip differential and incorporates a fill port that allows rapid filling of hydraulic fluid into the hydraulic control unit.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning to the drive wheel that is not spinning.

Electronically-controlled, limited-slip differentials can include a hydraulically-actuated clutch to limit differential rotation between output shafts of the differential. In some configurations a hydraulic delivery device may be located remote from the differential. In some examples it is challenging to efficiently fill such hydraulic delivery devices with hydraulic fluid.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A hydraulic control unit that delivers hydraulic fluid to a limited slip differential includes a hydraulic control unit housing, a vent hole and first and second passageways. The hydraulic control unit housing has an accumulator housing portion that houses a biasing assembly and a piston. The accumulator housing portion forms an accumulator chamber with the piston. The vent hole is defined in the hydraulic control unit housing. The first passageway is defined in the hydraulic control unit housing. The second passageway is defined in the hydraulic control unit housing that intersects the vent hole and is oriented at a different angle than the first passageway. The vent hole is dual purpose permitting hydraulic fluid entry into the accumulator chamber through the second passageway while air is permitted to escape the hydraulic control unit housing through the vent hole.

According to additional features, the first passageway is generally coaxial with the vent hole. A vent insert is disposed in the vent hole subsequent to filling of the hydraulic fluid. A motor is configured to pump fluid into the accumulator chamber of the accumulator housing portion. The biasing assembly further comprises a first biasing member having a first spring rate and a second biasing member having a second spring rate. The first and second biasing members are distinct.

In other features, the second passageway extends to a side of the biasing assembly along an axis so as to not intersect with the biasing assembly. The first passageway extends along an axis that intersect the biasing assembly. The first and second passageways define an angle between ten and eighty degrees. The vent hole is configured to receive a filling needle along the second passageway such that fluid from the filling needle enters the accumulator housing while air within the hydraulic control unit escapes through the vent hole. The filling needle defines an outer diameter that is less than an inner diameter of the vent hole.

A method of filling a hydraulic control unit that delivers hydraulic fluid to a limited slip differential with hydraulic fluid is provided. A hydraulic control unit housing has an accumulator housing portion that houses a biasing assembly and a piston. The accumulator housing portion forms an accumulator chamber with the piston. The hydraulic control unit defines a vent hole and a first passageway. A filling needle is inserted into an opening of the vent hole. The needle is advanced along a second passageway. The second passageway intersects the opening and is oriented at a different angle relative to the first passageway. Fluid is passed from the needle and into the accumulator housing while air within the hydraulic control unit escapes through the opening of the vent hole.

The needle is removed from the second passageway subsequent to the passing of fluid. Residue on the needle is viewed. A fill level of the accumulator housing is correlated based on the viewing. The needle is advanced along a path that does not intersect the biasing assembly. Advancing the needle includes advancing the needle to a position adjacent to the biasing assembly. Once the hydraulic control unit has been sufficiently filled with fluid, the needle is removed from the second passageway and a vent insert is inserted into the vent hole. Inserting the vent insert includes inserting the vent insert by way of a press-fit with the vent hole. The vent insert is advanced along an axis distinct from the second passageway. Advancing the needle along the second passageway includes advancing the needle along an axis that defines an angle of between ten and eighty degrees relative to a corresponding axis of the first passageway. The air escapes the hydraulic control unit concurrent to the fluid entering the accumulator housing.

BRIEF DESCRIPTION OF THE DRAWINGS

The present disclosure will become more fully understood from the detailed description and the accompanying drawings, wherein.

DETAILED DESCRIPTION

Figure 1:
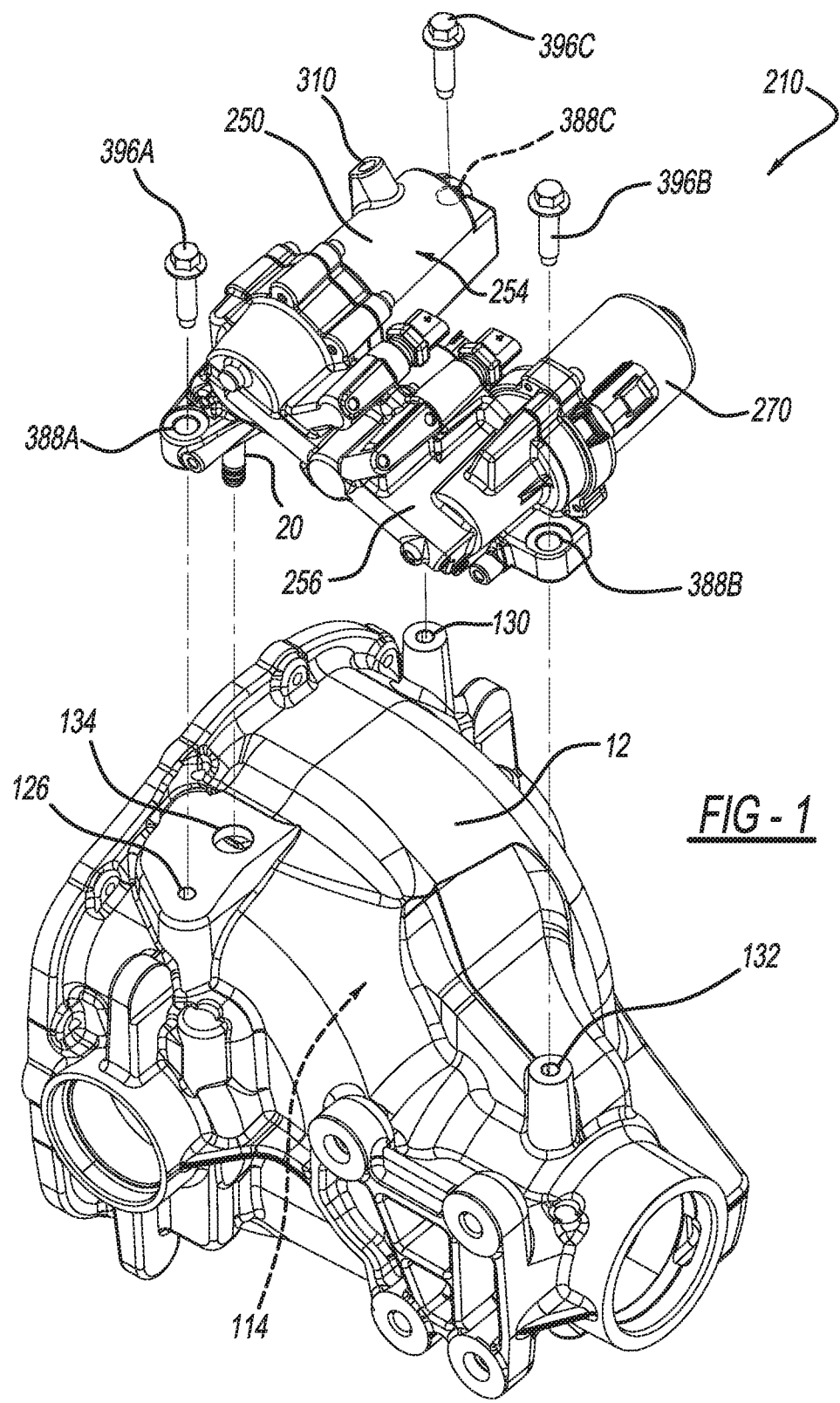
FIG. 1 is a first perspective view of a hydraulic control unit constructed in accordance to one example of the present disclosure and shown with an exemplary axle housing.

With initial reference to FIG. 1, a hydraulic control unit constructed in accordance to one example of the present disclosure is shown and generally identified with reference numeral 210. As will become appreciated herein, the hydraulic control unit 210 according to the present disclosure provides a single unit that can be mounted against or relative to an axle housing 12. In general, the hydraulic control unit 210 can deliver hydraulic fluid to a limited slip differential 114 housed in the axle housing 12 through a hydraulic coupling 20. The limited slip differential 114 can be an electronic limited slip differential having a clutch and a piston (not specifically shown).

The limited slip differential 114 can operate to drive a pair of axle shafts that are connected to a pair of respective drive wheels (not shown). In general, the limited slip differential 114 functions as a traditional open differential during normal operating conditions until an event occurs where a bias torque is required. When a loss in traction is detected or anticipated, the clutch can be selectively actuated in order to generate the optimum bias ratio for the situation.

The limited slip differential 114 can further include a differential gear assembly configured in a differential case that acts to allow the axle shafts to rotate at different speeds. The differential gear assembly can include a pair of side gears (not specifically shown) that are mounted for rotation with the axle shafts (and the drive wheels). In an open configuration, described below, the differential gear assembly acts to allow the axle shafts to rotate at different speeds.

The clutch couples a drive shaft output with the differential gear assembly. The clutch can include a clutch pack (not specifically shown) that has a plurality of annular plates interleaved between a plurality of annular friction disks. The plurality of annular plates and annular friction disks are interleaved between one another and act to rotate past one another in substantially non-contacting relationship when the clutch is in its open position. However, it will be appreciated by those skilled in the art that the term "non-contacting" as used herein is relative and is not meant to necessarily indicate that the annular plates and annular friction disks have absolutely no contact when the clutch is in the open condition. The annular plates and annular friction disks are axially movable into frictional engagement relative to one another, thereby reducing relative rotation between the annular plates and annular friction disks when the clutch is in the closed or partially closed configurations. In this manner, when the clutch is in its closed position, the side gears, as well as the axle shafts and the drive wheels rotate together.

The clutch can operate in an open configuration to allow the side gears to rotate independently from each other, e.g., at different speeds. The clutch can also operate in a closed or partially closed configuration where the side gears rotate together or partially together (that is, not independently), e.g., at substantially the same speed. The clutch is a hydraulic clutch that utilizes pressurized hydraulic fluid provided through the hydraulic fluid coupling from the hydraulic control unit 10 to act on the piston to selectively actuate the clutch pack between the open, closed and partially closed configurations. It will be appreciated that the limited slip differential described above is merely exemplary. In this regard, the hydraulic control unit 10 can be used to deliver hydraulic fluid to an actuator (piston, etc.) of any limited slip differential configuration.

With general reference now to FIGS. 1-6, the hydraulic control unit 210 will be described in greater detail. The hydraulic control unit 210 can generally include a hydraulic control unit housing 250 having an accumulator housing portion 254 and a housing manifold portion 256. The accumulator housing portion 254 can define an accumulator chamber 264 with the piston 267. The accumulator housing portion 254 houses first and second biasing members 266A and 266B and the piston 267. The first and second biasing members 266A and 266B can be collectively referred to herein as a biasing assembly 268. The first biasing member 266A has a first spring rate while the second biasing member 266B has a second spring rate. The first and second spring rates cooperate together to provide a desired spring rate for the biasing assembly 268. As will become appreciated herein, fluid is pumped behind the piston 267 into the accumulator chamber 264 to cause the piston 267 to translate toward the first and second biasing members 266A, 266B.

Figure 3:
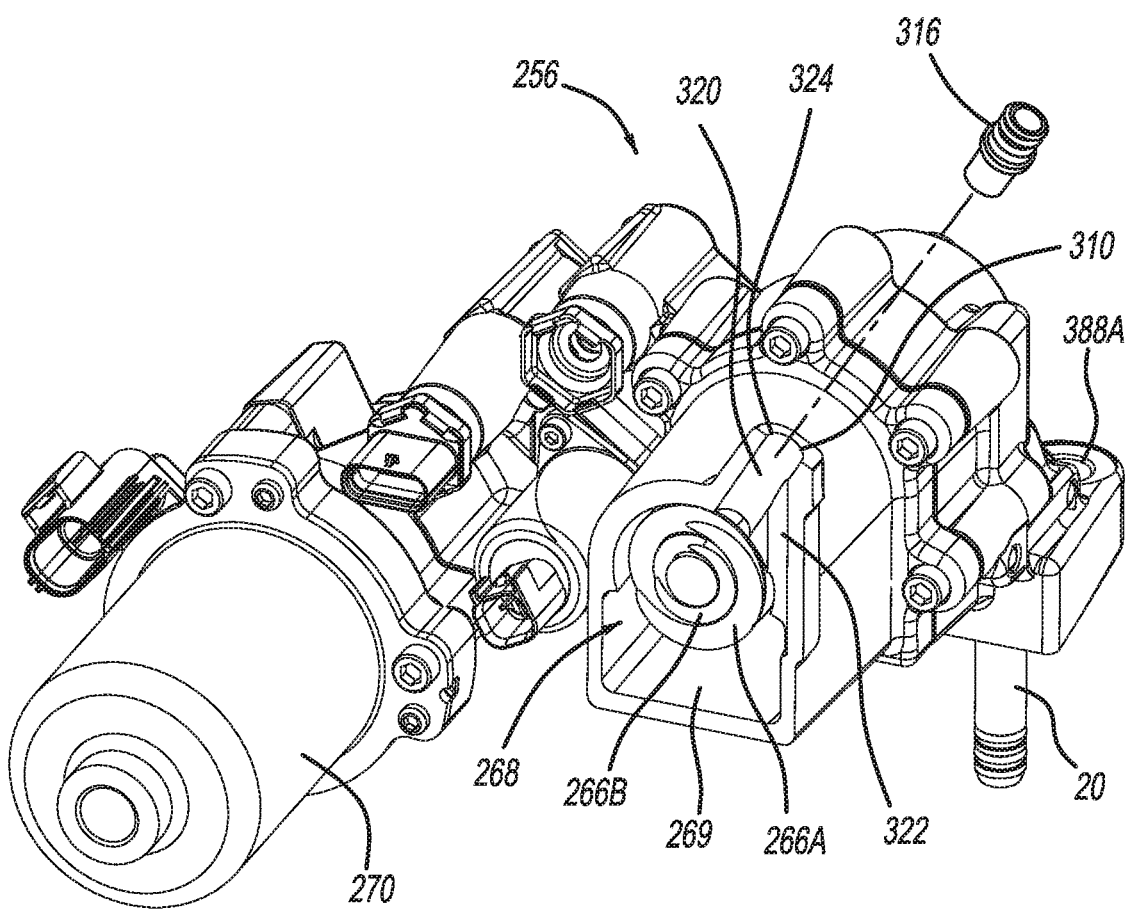
FIG. 3 is a cross-sectional view of the hydraulic control unit taken along lines 3-3 of FIG. 2 and shown with the fill port fitting exploded.

In the hydraulic control unit 210 of the present disclosure, the accumulator chamber 264 houses the biasing members 266A, 266B and also provides a hydraulic sump 269 (FIG. 3). Such a configuration allows for reduced packaging space. The housing manifold portion 256 can define various fluid passages configured to provide access to various sensors disclosed herein. The hydraulic control unit 210 can also comprise a motor 270 that can be coupled to the hydraulic control unit housing 250.

The hydraulic control unit 210 can further include a clutch piston pressure sensor, an accumulator pressure sensor and a three-way proportional regulating valve. The clutch piston pressure sensor can be threadably or otherwise securely received by the hydraulic control unit housing 250. The clutch piston pressure sensor can be configured to measure a pressure at the piston of the limited slip differential. The accumulator pressure sensor can be threadably or otherwise securely received by the hydraulic control unit housing 250. The accumulator pressure sensor can be configured to measure a pressure in the accumulator chamber 264. The three-way proportional regulating valve can be securely coupled to the hydraulic control unit housing 250. The three-way proportional regulating valve can be configured to regulate fluid pressure within the unitary hydraulic control unit housing 250.

The motor 270 can operate a piston pump or gerotor gear assembly and can be conventionally constructed. The gerotor gear assembly can comprise an inner gerotor gear and an outer gerotor gear. The operation of the gerotor gear assembly can be conventional where relative rotation of the inner and outer gerotor gears can cause a pumping action on the fluid contained in the hydraulic control unit housing 250. In examples where a piston pump is used, the piston pump can cause a pumping action on the fluid contained in the hydraulic control unit housing 250. The pumping action ultimately causes the fluid to be pumped into the accumulator chamber 264 (that shares a common space with the sump 269). The pumping action ultimately causes the fluid to be pumped into the accumulator chamber 264. In doing so, the biasing members 266A, 266B at least partially collapse and introduces a pre-charge into the system. In this regard, the motor 270 is not required to run constantly. The fluid pressure can be introduced into the limited slip differential by the biasing members 266A, 266B acting on the piston 267. A pressure relief valve 280 can be provided in the piston 267. The pressure relief valve 280 can protect the system by releasing fluid in the event of an over pressure malfunction.

A sleeve 282 is positioned between the accumulator housing portion 254 and the piston 267. In one example the sleeve 282 can be formed of a dissimilar material than the accumulator housing portion 254 and the piston 267. For example, the sleeve 282 can be formed of steel while the accumulator housing portion 254 and piston 267 are formed of aluminum. Because the sleeve 282 is formed of a different material, it can facilitate smoother slidable operation of the piston 267 within the accumulator housing portion 254. An o-ring 284 can sealingly located between the accumulator housing portion 254 and the sleeve 282.

The piston 267 can have wear rings 284 and 286 positioned on opposite ends of a seal member 288. The wear rings 284 and 286 can minimize the tendency of the piston 267 from cocking or moving off axis during translation. A screen 290 is disposed on the piston 267 to keep large debris out of the accumulator housing portion 254. A guide rod 292 is located within the biasing members 266A, 266B to support and minimize buckling of the biasing members 266A, 266B.

Figure 4:
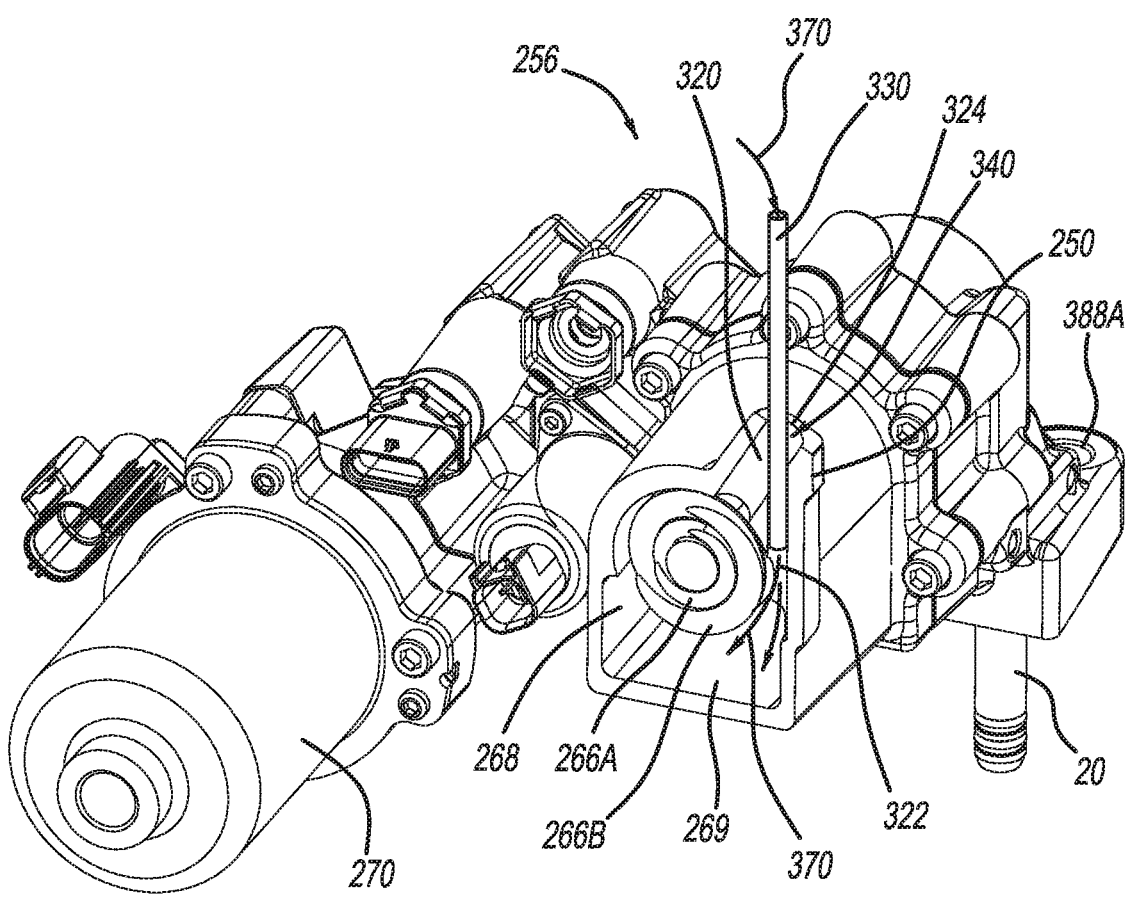
FIG. 4 is a close-up view of the fill port and shown with a filling needle inserted through a second passageway of the hydraulic control unit housing during a filling event.
Figure 5:
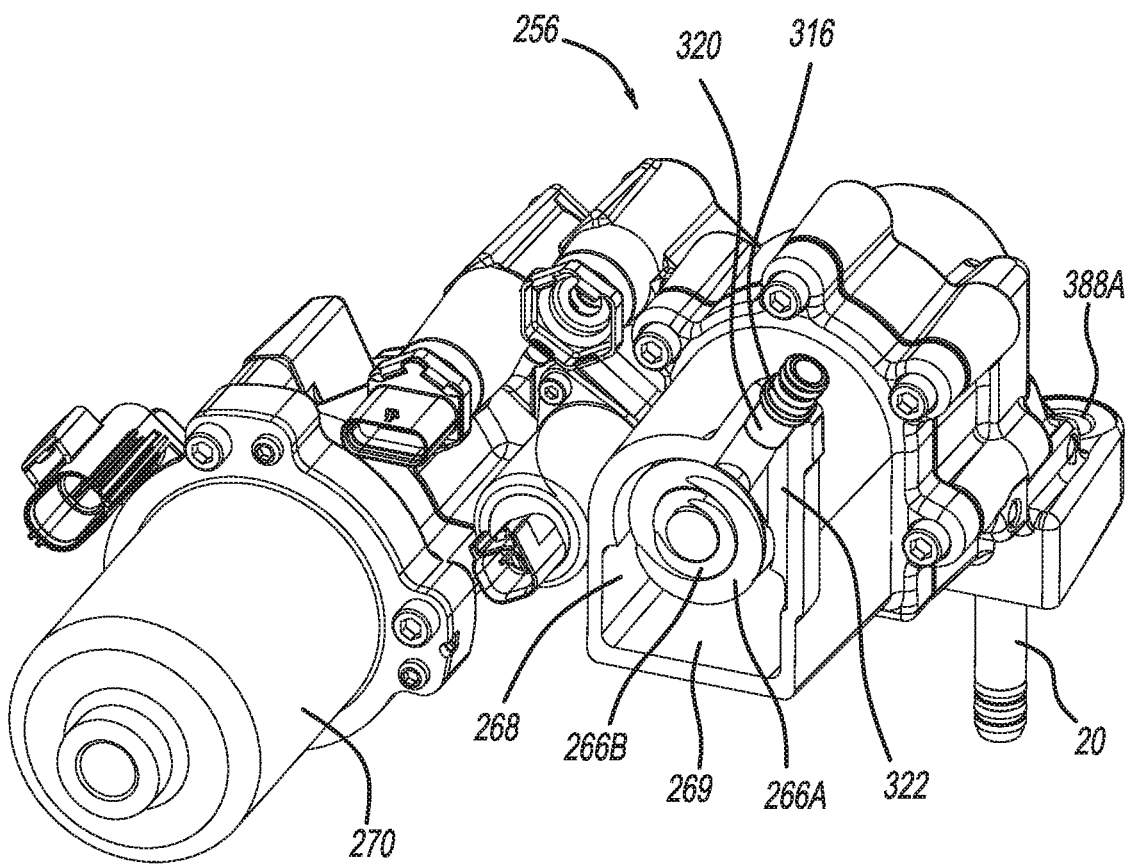
FIG. 5 is a cross-sectional view of the hydraulic control unit taken along lines 3-3 of FIG. 2 and shown with the fill port fitting installed.
Figure 6:
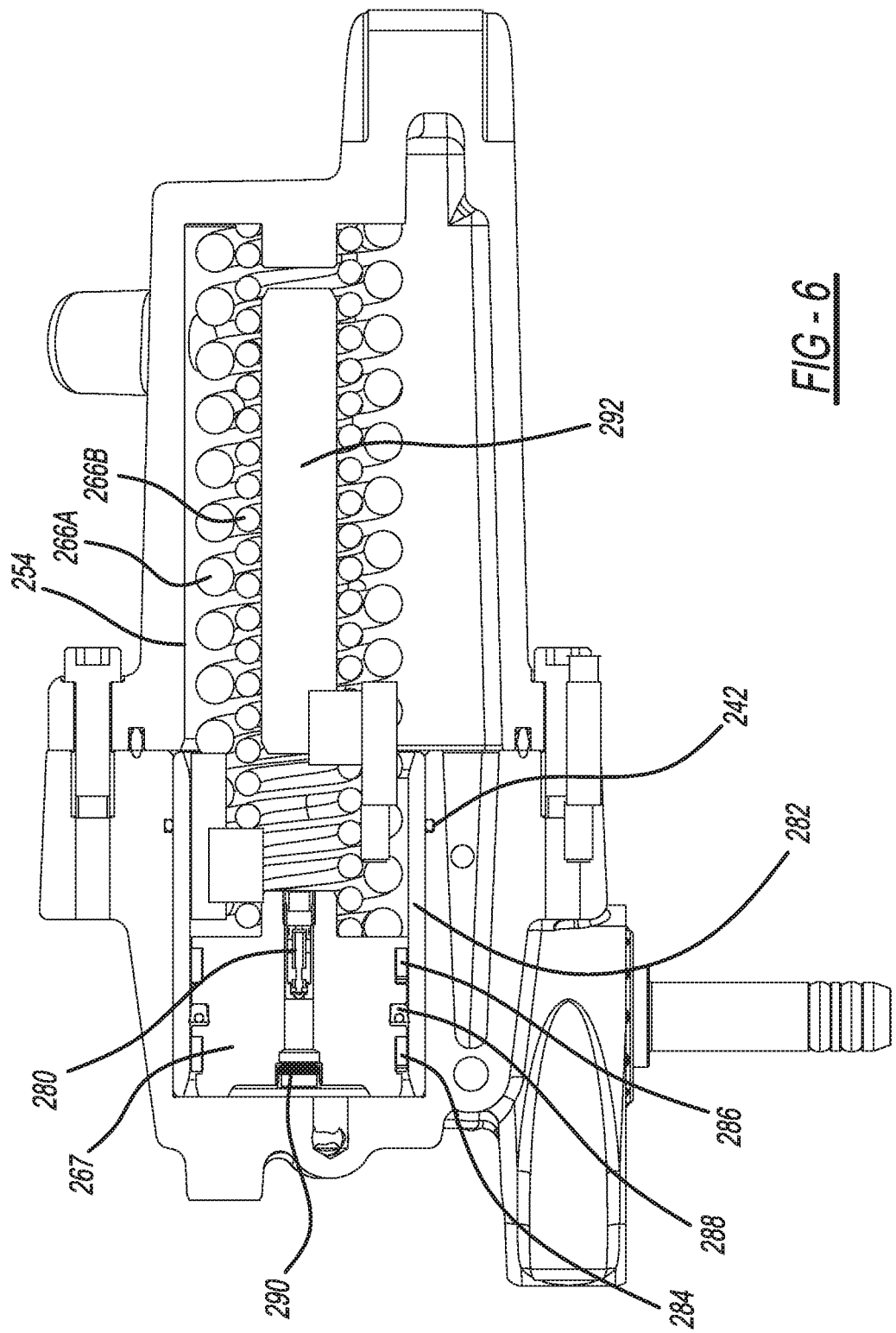
FIG. 6 is a cross-sectional view of the hydraulic control unit take along lines 6-6 of FIG. 2.

With particular reference now to FIGS. 3 and 4 additional features of the hydraulic control unit housing 250 will be described. The hydraulic control unit housing 250 is configured to allow for easy filling of hydraulic fluid. Specifically, hydraulic fluid can be filled through a bypass fill port 324 defined in the hydraulic control unit housing 250. As will become appreciated, the bypass fill port 324 shares a common opening in the housing 250 with a vent hole 310. In this regard, the bypass fill port 324 and the vent hole 310 are dual purpose in that they permit fluid entry into the accumulator chamber 264 and also serve as a vent for passage of air. Once the hydraulic control unit housing 250 has been sufficiently filled with fluid, a vent insert 316 can be inserted, such as by way of press-fit, into the vent hole 310. The configuration of the hydraulic control unit housing 250 allows fluid to be injected quickly into the accumulator chamber 264 without splash back. In some examples the hydraulic control unit housing 250 can be filled within a few seconds.

The hydraulic control unit housing 250 includes a first passageway 320 that is generally coaxial with the vent hole 310. The hydraulic control unit 250 further includes a second passageway 322 that may intersect the first passageway 320, but which is oriented at a different angle than the first passageway 320. The second passageway 322 is accessible through the vent hole 310. The first and second passageways 320 and 322 can define an angle between ten and eighty degrees. The second passageway 322 serves as the bypass fill port 324. In this regard, a filling needle 330 (FIG. 4) may be inserted into the opening 324 and along the second passageway 322. The second passageway 322 extends to a side of the biasing assembly 268 along an axis that does not intersect with the biasing assembly 268. Conversely, the first passageway 320 extends along an axis that intersects the biasing assembly 268. The filling needle 330 defines an outer diameter less than an inner diameter of the opening 324.

Fluid 370 may be deployed from the filling needle 330 and into the accumulator chamber 264 while air is permitted to escape the accumulator chamber 264 through an annular space 340 at the opening 324 around the outside of the filing needle 330. The filling needle 330 can further be used as a dipstick whereby a user can deliver the fluid 370 into the accumulator chamber 264, remove the filling needle 330 and view fluid residue on the filling needle 330 to correlate a fill level within the accumulator chamber 264.

Figure 2:
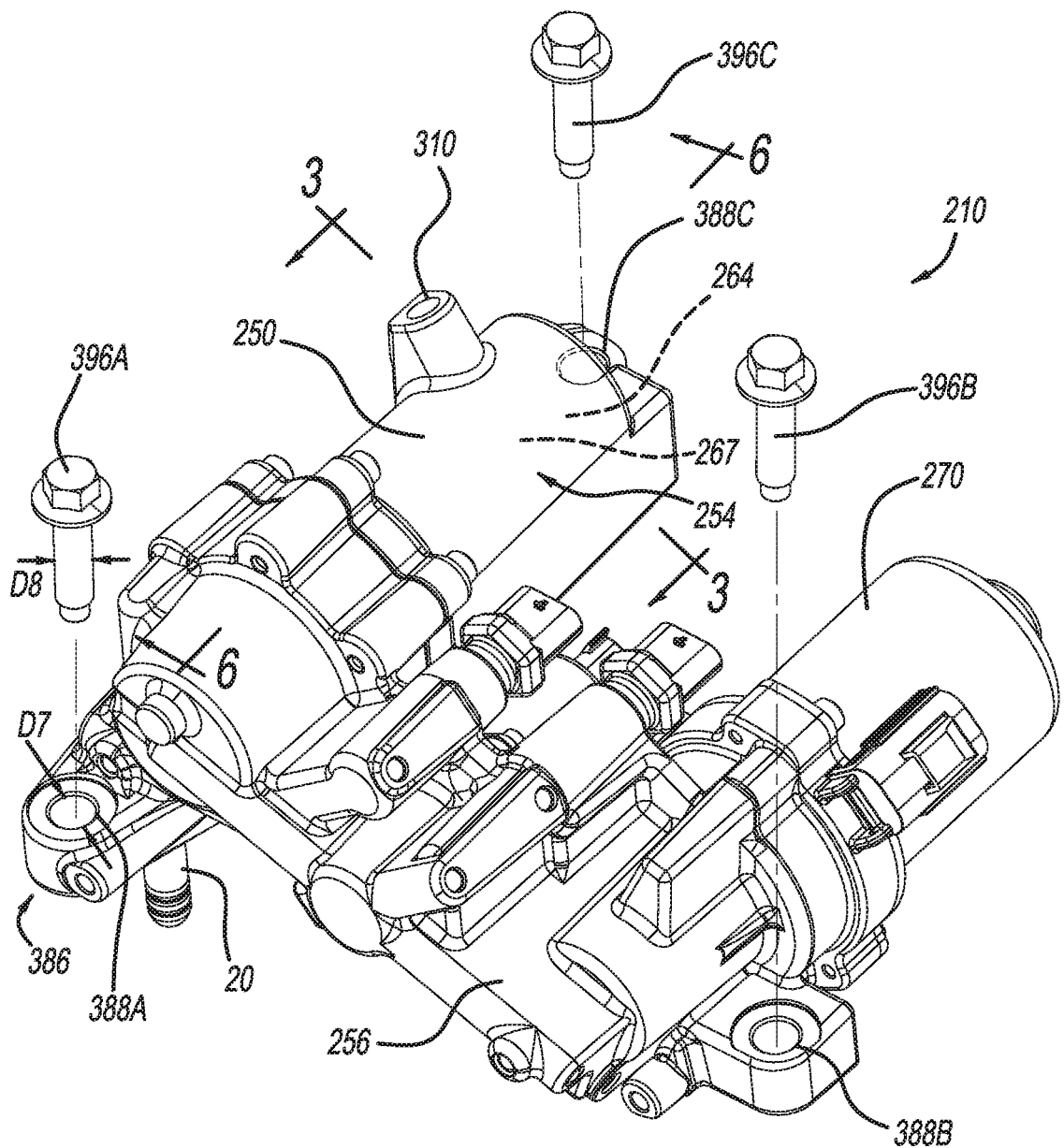
FIG. 2 is a front perspective view of the hydraulic control unit of FIG. 1.

With specific reference now to FIGS. 1 and 2, additional features of the hydraulic control unit housing 250 will be described. The hydraulic control unit housing 250 can define a receiving bore (see 84, FIG. 5) that is configured to receive the hydraulic coupling 20. The hydraulic control unit housing 250 can include a hydraulic control unit housing mounting structure collectively identified at reference numeral 386. The hydraulic control unit housing mounting structure 386 can generally include a first, second and third receiving bores 388A, 388B and 388C. The first, second and third receiving bores 388A, 388B and 388C can define a diameter D7 (FIG. 2).

Fasteners 396A, 396B and 396C can extend through the first, second and third receiving bores 388A, 388B and 388C and threadably mate with the bores 126, 132 and 130 (FIG. 1), respectively. The fasteners 396A, 396B and 396C can have an outer diameter D8 (FIG. 2). The outer diameter D8 is less than the diameter D7 to allow for misalignment during assembly.

Once the hydraulic coupler 20 is suitably received by a hydraulic port and acceptable alignment is attained, the fasteners 396A, 396B and 396C can be tightened to a fixed position with the first and second mounting bores 126, 132 and 130 of the axle housing 12. Again, the receiving bores 388A, 388B and 388C have a greater diameter than the fasteners 396A, 396B and 396C allowing for lateral movement of the housing manifold portion 256 relative to the axle housing 12 prior to tightening the second fasteners 396A, 396B and 396C into the respective bores 388A, 388B and 388C.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A hydraulic control unit that delivers hydraulic fluid to a limited slip differential, the hydraulic control unit comprising:
    a hydraulic control unit housing having an accumulator housing portion that houses a biasing assembly and a piston, the accumulator housing portion forming an accumulator chamber with the piston;
    a vent hole defined in the hydraulic control unit housing;
    a first passageway defined by the hydraulic control unit housing and that extends from the vent hole; and
    a second passageway defined in the hydraulic control unit housing that intersects the first passageway and is oriented at a different angle than the first passageway;
    wherein the vent hole is dual purpose permitting hydraulic fluid entry into the accumulator chamber through the second passageway while air is permitted to escape the hydraulic control unit housing through the vent hole.

2. The hydraulic control unit of claim 1 wherein the first passageway is generally coaxial with the vent hole.

3. The hydraulic control unit of claim 1, further comprising a vent insert disposed in the vent hole subsequent to filling of the hydraulic fluid.

4. The hydraulic control unit of claim 3, further comprising:
   a motor that is configured to pump fluid into the accumulator chamber of the accumulator housing portion.

5. The hydraulic control unit of claim 1 wherein the biasing assembly further comprises:
   a first biasing member having a first spring rate; and
   a second biasing member having a second spring rate, wherein the first and second spring rates are distinct.

6. The hydraulic control unit of claim 1 wherein the second passageway extends to a side of the biasing assembly along an axis so as to not intersect with the biasing assembly.

7. The hydraulic control unit of claim 1 wherein the first passageway extends along an axis that intersects the biasing assembly.

8. The hydraulic control unit of claim 1 wherein the first and second passageways define an angle between ten and eighty degrees.

9. The hydraulic control unit of claim 1 wherein the vent hole is configured to receive a filling needle along the second passageway such that fluid from the filling needle enters the accumulator housing portion while air within the hydraulic control unit escapes through the vent hole.

10. The hydraulic control unit of claim 9 wherein the filing needle defines an outer diameter that is less than an inner diameter of the vent hole.

11. A hydraulic control unit that delivers hydraulic fluid to a limited slip differential, the hydraulic control unit comprising:
   a hydraulic control unit housing having an accumulator housing portion and a housing manifold portion that collectively house a biasing assembly and a piston, the housing manifold portion forming an accumulator chamber with the piston;
   a vent hole defined in the hydraulic control unit housing;
   a first passageway defined by the hydraulic control unit housing that is generally coaxial with the vent hole; and
   a second passageway defined in the hydraulic control unit housing that intersects the first passageway and that is oriented at a different angle than the first passageway;
   wherein the vent hole is dual purpose permitting hydraulic fluid entry into the accumulator chamber through the second passageway while air is permitted to escape the hydraulic control unit housing through the vent hole.

12. The hydraulic control unit of claim 11, further comprising a vent insert disposed in the vent hole subsequent filling of the hydraulic fluid.

13. The hydraulic control unit of claim 12, further comprising:
   a motor that is configured to pump fluid into the accumulator chamber of the accumulator housing portion.

14. The hydraulic control unit of claim 11 wherein the biasing assembly further comprises:
   a first biasing member having a first spring rate;
   a second biasing member having a second spring rate, wherein the first and second spring rates are distinct; and
   a guide rod that supports the first and second biasing members.

15. The hydraulic control unit of claim 14 wherein fluid pumped into the accumulator housing portion at least partially collapses the biasing assembly and introduces a pre-charge into the hydraulic control unit, wherein the biasing assembly is configured to subsequently expand after the pre-charge and urge the piston in a first direction resulting in fluid being communicated from the hydraulic control unit and into the limited slip differential.

16. The hydraulic control unit of claim 11 wherein the hydraulic control unit housing further comprises:
   a hydraulic control unit housing mounting structure having first and second receiving bores that both define a first diameter and wherein a first pair of first fasteners that both define a second diameter, less than the first diameter, couple the hydraulic control unit to an axle housing that houses the limited slip differential.

17. The hydraulic control unit of claim 16, further comprising a hydraulic coupling that has a first end that is received by the first receiving bore defined on the hydraulic control unit housing, wherein the hydraulic coupling has a second end that is configured to be received by the second receiving bore defined on the limited slip differential, wherein the hydraulic coupling is configured to extend through a hydraulic coupler receiving bore defined in the axle housing.

18. The hydraulic control unit of claim 17 wherein the axle housing defines an inner diameter that is greater than an outer diameter of the hydraulic coupling, wherein the hydraulic coupling is permitted to locate at a plurality of positions relative to the inner diameter of the axle housing during assembly of the hydraulic control unit to the limited slip differential to accommodate a corresponding plurality of positions of the differential relative to the axle housing.

19. A hydraulic control unit that delivers hydraulic fluid to a limited slip differential, the hydraulic control unit comprising:
   a hydraulic control unit housing having an accumulator housing portion and a housing manifold portion that collectively house a biasing assembly and a piston, the housing manifold portion forming an accumulator chamber with the piston;
   a vent hole defined in the hydraulic control unit housing;
   a first passageway defined by the hydraulic control unit housing that is generally coaxial with the vent hole;
   a second passageway defined in the hydraulic control unit housing and that intersects the first passageway; and
   a bypass fill port defined in the hydraulic control unit housing that is accessible through the vent hole;
   wherein the vent hole is dual purpose permitting hydraulic fluid entry into the accumulator chamber through the second passageway while air is permitted to escape the hydraulic control unit housing through the vent hole.

20. The hydraulic control unit of claim 19, further comprising:
   a vent insert disposed in the vent hole subsequent filling of the hydraulic fluid; and
   a motor that is configured to pump fluid into the accumulator chamber of the accumulator housing portion.

* * * * *